United States Patent
Pabla

(10) Patent No.: US 9,479,241 B2
(45) Date of Patent: Oct. 25, 2016

(54) WIRELESS SYSTEM WITH CONFIGURABLE RADIO AND ANTENNA RESOURCES

(71) Applicant: Arbinder Singh Pabla, Fremont, CA (US)

(72) Inventor: Arbinder Singh Pabla, Fremont, CA (US)

(*) Notice: Subject to any disclaimer, the term of this patent is extended or adjusted under 35 U.S.C. 154(b) by 0 days.

(21) Appl. No.: 14/519,086

(22) Filed: Oct. 20, 2014

(65) Prior Publication Data

US 2015/0110049 A1 Apr. 23, 2015

Related U.S. Application Data

(60) Provisional application No. 61/893,266, filed on Oct. 20, 2013.

(51) Int. Cl.
*H04B 7/06* (2006.01)
*H04W 88/08* (2009.01)
*H04W 84/12* (2009.01)
*H04B 7/04* (2006.01)

(52) U.S. Cl.
CPC .......... *H04B 7/0697* (2013.01); *H04B 7/0617* (2013.01); *H04B 7/0691* (2013.01); *H04B 7/0413* (2013.01); *H04W 84/12* (2013.01); *H04W 88/085* (2013.01)

(58) Field of Classification Search
None
See application file for complete search history.

(56) References Cited

U.S. PATENT DOCUMENTS

| | | | |
|---|---|---|---|
| 7,411,564 B2* | 8/2008 | Thevenot | H01Q 5/00 343/700 MS |
| 7,415,288 B1 | 8/2008 | Hou et al. | |
| 7,446,712 B2* | 11/2008 | Itoh | H01Q 13/206 343/700 MS |
| 7,714,782 B2* | 5/2010 | Davis et al. | 342/377 |
| 7,764,232 B2* | 7/2010 | Achour et al. | 343/700 MS |
| 7,860,183 B2* | 12/2010 | Maltsev | H04B 7/043 370/208 |
| 7,873,319 B2 | 1/2011 | Lastinger et al. | |
| 7,881,258 B2* | 2/2011 | Gilbert | H04L 45/24 370/329 |
| 8,229,506 B2 | 7/2012 | Duet et al. | |
| 8,289,910 B2* | 10/2012 | Gabriel et al. | 370/329 |
| 8,482,478 B2 | 7/2013 | Hartenstein | |
| 8,483,200 B2* | 7/2013 | Cha | H04B 7/0413 370/310 |
| 8,494,587 B2* | 7/2013 | Picker | H04W 72/04 370/337 |
| 8,538,420 B2* | 9/2013 | Picker | H04W 8/12 455/432.1 |
| 8,634,339 B2* | 1/2014 | Picker | H04W 16/10 370/315 |
| 8,665,846 B2* | 3/2014 | O'Keefe | 370/338 |
| 8,676,193 B2* | 3/2014 | Picker | H04W 28/0247 370/310.2 |
| 8,730,125 B2* | 5/2014 | De Flaviis | H01Q 13/10 343/770 |
| 8,810,455 B2* | 8/2014 | Achour et al. | 343/700 MS |
| 8,891,464 B2* | 11/2014 | Picker | H04W 88/08 370/328 |
| 8,942,659 B2* | 1/2015 | Gulati | H04B 1/44 455/130 |
| 8,976,884 B2* | 3/2015 | Krishnamurthy | H04B 7/0413 370/252 |
| 9,070,977 B2* | 6/2015 | Choudhury | H01Q 3/26 |
| 9,094,953 B2* | 7/2015 | Picker | H04W 72/04 |
| 9,113,354 B2* | 8/2015 | Picker | H04W 28/0247 |
| 9,124,005 B2* | 9/2015 | Nguyen | H01Q 13/20 |
| 9,167,474 B2* | 10/2015 | Picker | H04W 28/0247 |

(Continued)

OTHER PUBLICATIONS

Liu, L., C. Caloz, and T. Itoh, "Beam-switchable scanning leaky-wave antenna" Electronics Letters, Mar. 30, 2000, vol. 36, No. 7, p. 596-7.

(Continued)

*Primary Examiner* — Gregory Sefcheck
(74) *Attorney, Agent, or Firm* — Fish & Richardson P.C.

(57) ABSTRACT

A wireless access device, system and method are disclosed for provisioning multiple concurrent radio services and adaptive management of multi-radio access points or multi-radio small cell base stations.

37 Claims, 14 Drawing Sheets

(56) References Cited

U.S. PATENT DOCUMENTS

| | | |
|---|---|---|
| 2006/0109067 A1 | 5/2006 | Shtrom |
| 2006/0192720 A1 | 8/2006 | Shtrom |
| 2008/0139136 A1 | 6/2008 | Shtrom et al. |
| 2009/0028098 A1 | 1/2009 | Gates et al. |
| 2010/0119002 A1 | 5/2010 | Hartenstein |
| 2010/0137024 A1 | 6/2010 | Maguire |
| 2011/0130092 A1 | 6/2011 | Yun et al. |
| 2011/0249576 A1 | 10/2011 | Chrisikos et al. |
| 2011/0276963 A1 | 11/2011 | Wu et al. |
| 2012/0274524 A1 | 11/2012 | Piazza et al. |
| 2012/0300682 A1 | 11/2012 | Hartenstein |
| 2013/0038496 A1 | 2/2013 | Kish et al. |
| 2013/0039355 A1 | 2/2013 | De La Garrigue |
| 2013/0157710 A1* | 6/2013 | Nammi et al. ............ 455/525 |
| 2014/0161203 A1* | 6/2014 | Nammi et al. ............ 375/267 |
| 2014/0210681 A1 | 7/2014 | Shtrom |
| 2014/0225807 A1 | 8/2014 | Shtrom et al. |
| 2014/0266944 A1 | 9/2014 | Hartenstein |
| 2015/0022413 A1 | 1/2015 | Louzir et al. |
| 2015/0110212 A1 | 4/2015 | Pabla |

OTHER PUBLICATIONS

Nguyen, Hoang V. and Caloz, Christophe, "Performance-Enhanced and Symmetric Full-Space Scanning End-Switched CRLH LWA", IEEE Antennas and Wireless Propagation Letters, vol. 10, 2011, p. 709-712.

D. R. Jackson, C. Caloz, and T. Itoh, "Leaky-wave antennas," Proc. IEEE, vol. 100, No. 7, pp. 2194-2206, Jul. 2012.

Liu, L., C. Caloz, and T. Itoh, "Dominant mode leaky-wave antenna with backfire-to-endfire scanning capability," Electronics Letters, vol. 38, 1414-1416, 2002.

M.R. Hashemi and T. Itoh, "Dual-Mode Leaky-Wave Excitation in Symmetric Composite Right/Left-Handed Structure with Center Vias". Microwave Symposium Digest (MTT), 2010 IEEE MTT-S International, vol., No., pp. 9-12, May 23-28, 2010IMS2010.

"BeamFlex® Smart Antenna System," Feature Sheet, Ruckus Wireless, Inc., Mar. 2013, 3 pages.

"All Beamforming Solutions Are Not Equal—Discussion of the Topic of 'Beamforming'," Ruckus Wireless, Inc., Jan. 2013, 9 pages.

"Wireless Access Points and Arrays to meet your every need." Xirrus, Inc., 2014, 2 pages.

"Xirrus Wireless Array, XR-6000 Series," Product Datasheet, Xirrus, Inc., Jan. 27, 2014, 4 pages.

International Search Report and Written Opinion of the International Searching Authority, PCT Application No. PCT/US2014/061422, dated Feb. 4, 2005, 12 pp.

International Search Report and Written Opinion; PCT/US2014/061422; Feb. 4, 2015; 20 pp.

* cited by examiner

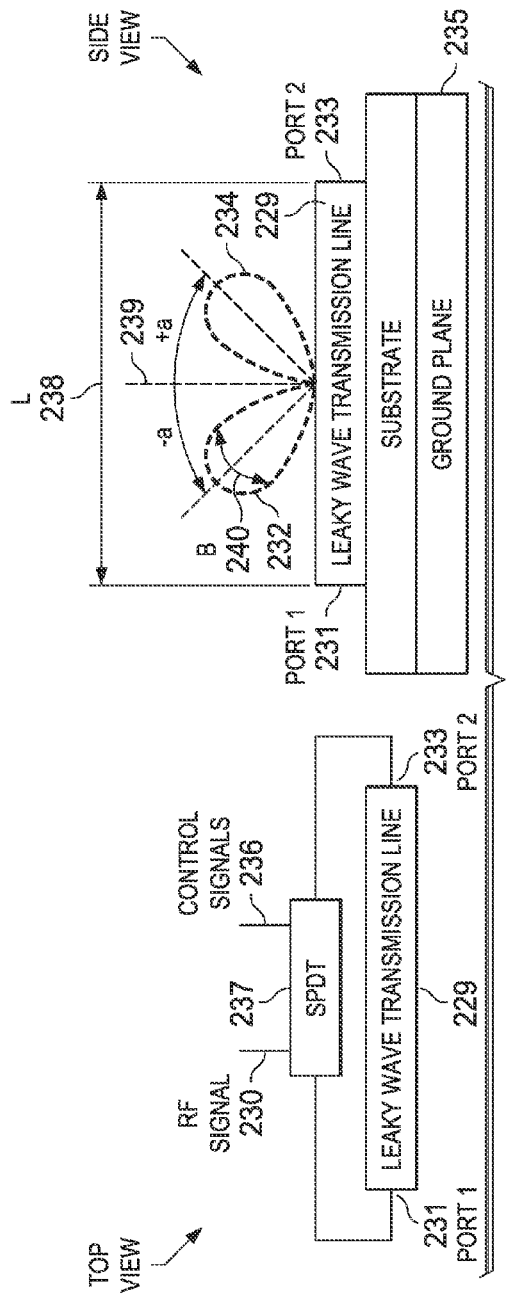
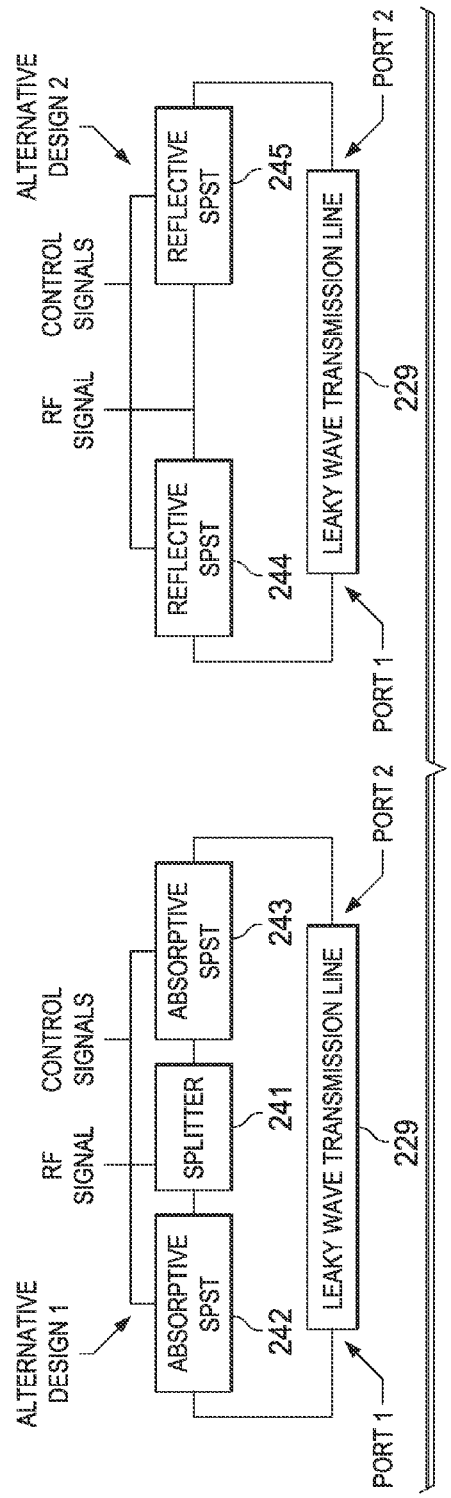
FIG. 2B
FIG. 2C

| | BAND | MIMO | FRONT RIGHT SECTOR | FRONT LEFT SECTOR | BACK RIGHT SECTOR | BACK LEFT SECTOR |
|---|---|---|---|---|---|---|
| RADIO 1 | 2.4 GHz | 2x2 | X | X | | |
| RADIO 2 | 5 GHz | 3x3 | X | X | | |
| RADIO 3 | 5 GHz | 3x3 | X | X | | |
| RADIO 4 | 5 GHz | 3x3 | X | X | | |
| RADIO 5 | 2.4 GHz | 2x2 | | | X | X |
| RADIO 6 | 5 GHz | 3x3 | | | X | X |
| RADIO 7 | 5 GHz | 3x3 | | | X | X |
| RADIO 8 | 5 GHz | 3x3 | | | X | X |

| | BAND | TECHNOLOGY | BANDWIDTH | MIMO | CHANNEL | COVERAGE |
|---|---|---|---|---|---|---|
| RADIO 1 | 2.4 GHz | 802.11n | 20 MHz | 2x2 | 1 | FRONT 180° |
| RADIO 2 | 2.4 GHz | 802.11n | 20 MHz | 2x2 | 11 | BACK 180° |
| RADIO 3 | 5 GHz | 802.11ac | 20 MHz | 3x3 | 36 | FRONT 180° |
| RADIO 4 | 5 GHz | 802.11ac | 20 MHz | 3x3 | 40 | LEFT 180° |
| RADIO 5 | 5 GHz | 802.11ac | 20 MHz | 3x3 | 44 | BACK 180° |
| RADIO 6 | 5 GHz | 802.11ac | 20 MHz | 3x3 | 48 | RIGHT 180° |
| RADIO 7 | 5 GHz | 802.11ac | 40 MHz | 3x3 | 60+64 | 360° |
| RADIO 8 | 5 GHz | 802.11ac | 20 MHz | 3x3 | 149 | 360° |

WIRELESS SYSTEM WITH CONFIGURABLE RADIO AND ANTENNA RESOURCES

CROSS-REFERENCE TO RELATED APPLICATIONS

This patent application claims priority to U.S. Provisional Patent Application No. 61/893,266, entitled "Wireless System with Configurable Radio and Antenna Resources," filed Oct. 20, 2013, the entire contents of which are incorporated herein by reference.

TECHNICAL FIELD

This disclosure is related generally to wireless communication systems.

BACKGROUND

Wireless access points used in for example Wireless Fidelity ("WiFi") communications may be employed individually or a multiplicity of wireless access points may be deployed in a wireless Local Area Network (WLAN) system. An access point (AP) requires management of its mandatory functions and management of optional functions that may be implemented. A WLAN system also requires a coordination function to manage the cooperation and inter-operation of APs in a WLAN system to provide, for example, seamless coverage throughout the network, authentication of a motive user on a WLAN, management of RF interference and optimal use of the WLAN resource. This coordination function is undertaken by what is commonly referred to as a network controller. The principle purpose of a network controller is to optimally control the individual elements on the network.

SUMMARY

A universally flexible AP architecture is disclosed. In some implementations, the architecture includes: a communication interface; a multiplicity of processors in a backplane processor bank; a radio bank comprising a multiplicity of radios which can be dynamically assigned to a multiplicity of independently configurable antennas; an interface matrix to dynamically interconnect the multiplicity of radios in the radio bank to the multiplicity of configurable antennas in the antenna bank; and an antenna bank comprising a multiplicity of configurable antennas which can be independently configured.

In some implementations, a hypervisor optimally assigns and configures the multiplicity of radios in the radio bank, the interface matrix, the multiplicity of configurable antennas in the antenna bank, and the association of a wireless device to a radio in the radio bank to maximally utilize the available spectrum, provide optimal use of the radio resources and deliver a multitude of network services to wireless client devices. It is a feature of the configurable antennas that each antenna is independently configurable to emit directive RF into one spatial sector, and alternatively configured to radiate into a different spatial sector, or alternatively configured to radiate and the spatial sector being defined by the beam pattern of said antenna.

The hypervisor bases its assignments of resource upon a multiplicity of inputs such as, the measured RF signals at a multiplicity of radios from a multiplicity of other radios, the traffic and quality of service requirements from the user, the network configuration and coverage required from the service provider, the capabilities of the multiplicity of radios in the radio bank, the number of radios in the radio bank, the capabilities of the interface matrix, the capabilities of the multiplicity of configurable antennas in the antenna bank, the number of configurable antennas in the antenna bank, the capabilities of the wireless devices that want to connect to the radios, etc. The information used by the hypervisor to make its decision can pertain to the universally flexible AP where the hypervisor is implemented or from a multiplicity of other universally flexible AP, or a combination of both. The hypervisor can be implemented in software and/or hardware entirely locally in the bank of processors, or in a distributed implementation over a multiplicity of universally flexible AP arranged in a cluster and, optionally, on a remote server.

Particular implementations of the universally flexible AP architecture disclosed herein provide one or more of the following advantages. The universally flexible AP architecture provides scaled capacity, using a multiplicity of radios that optimally utilizes all the radios to adapt to changing usage of the unit. It is further advantage that this functionality is provided in a compact footprint with low power consumption and that the multiple antennas are low profile analog planar antennas, such as travelling wave antennas.

Some of the advantages of the distributed hypervisor include but are not limited to: (1) self-organized network (SON) functionality: universally flexible AP 1501 units self-configured using distributed algorithms; (2) scalable (each universally flexible AP 1501 units brings its own hardware and more processing power to the network); (3) less traffic in the backbone network in the presence of mobility; (4) not a single point of failure; (5) support coordinated multipoint (CoMP) management of channel assignment, power levels, antenna configuration in a cluster 1505 which offers better network performance than local resource management per universally flexible AP 1501; (6) provisioning of fast universally flexible AP 1501 reconfiguration for dynamic traffic demand and RF interference due to the smaller number of universally flexible AP 1501 in a cluster 1505 than in a complete network, as managed by the cloud hypervisor 1402; (7) energy-efficiency management by turning on/off units/radios as required and no cooling required as for a rack-based hardware WLAN controller; and (8) reduced backbone network messaging overhead.

The universally flexible AP architecture and hypervisor disclosed herein can be deployed and used in various network topologies ranging in scale and service function: e.g. a WLAN to a Wide Area Network (WAN) and a WiFi network and a cellular/LTE network or combination.

The details of the one or more implementations disclosed herein are set forth in the accompanying drawings and the description below. Other features, aspects and advantages will become apparent from the description, the drawings and the claims.

BRIEF DESCRIPTION OF THE DRAWINGS

FIG. 2B illustrates how a passive leakywave antenna can be employed to provide sectorized switching.

FIG. 2C shows two alternative embodiments of configurable antennas

Like reference symbols in the various drawings indicate like elements.

DETAILED DESCRIPTION

There are various methods of implementing control and management of APs in a WLAN. For example, the controller may be embedded in one AP; the controller may be abstracted from the APs and centralized in the WLAN; or the controller may be distributed amongst the APs within the WLAN. The manager may similarly be embedded on one AP, may be abstracted from the AP into a separate management console that signals to and from the APs in the WLAN. In addition the manager and the controller may reside outside the WLAN, and interface to the WLAN over a WAN or intranet, or via the Internet, commonly called "being in the cloud."

In a WLAN, a class of network elements to be controlled by a wireless controller are the radios embedded within the AP or APs. Each AP will typically have a multiplicity of radios and can be configured by the manager to operate individually or in cooperation, for example in Single Input Single Output (SISO) or in Multiple Input Multiple Output (MIMO) modes of operation. By way of generalization, a transmitting radio on an AP operating in MIMO mode, of order M×N, would have a multiplicity of M antennas, M radio chains and M interfaces to a unitary radio. On the client receiver side, the client would have N antennas, N radio chains and N interfaces to a unitary radio. The antennas employed in such a unit may have a diversity of radiating characteristics, either being omnidirectional antennas or fixed directional antennas or configurable directional antenna radiators or any combination of these. The number of spatial streams established by an array of antennas can also be managed and controlled during operation, but the extent of the reconfiguration will be determined by physical choice of antennas and how they operate. In particular, directional antennas capable of beamforming, using digital beamforming and beamsteering methods, as distinguished from analog beamforming and beamsteering methods or analog fixed directional beams, have a natural compromise between the number of antennas and the number of spatial streams that can be constructed digitally, such that the maximum number of spatial streams is always fewer than the number of antennas.

Analog arrays, specifically analog antenna arrays constructed from antennas that are analog beamforming or directional antennas, are not limited by this compromise, allowing the maximum number of spatial streams to be equated to the number of analog antennas. It is thus preferential, where possible, to employ a multiplicity of analog beam forming and beam steering antennas, or a multiplicity of analog fixed directional antennas, rather than digital beam forming and beam steering means, in situations where the maximum number of simultaneous spatial streams are required with the fewest antennas and the antennas are planar antennas that can be fabricated into planar arrays.

Figure 1:
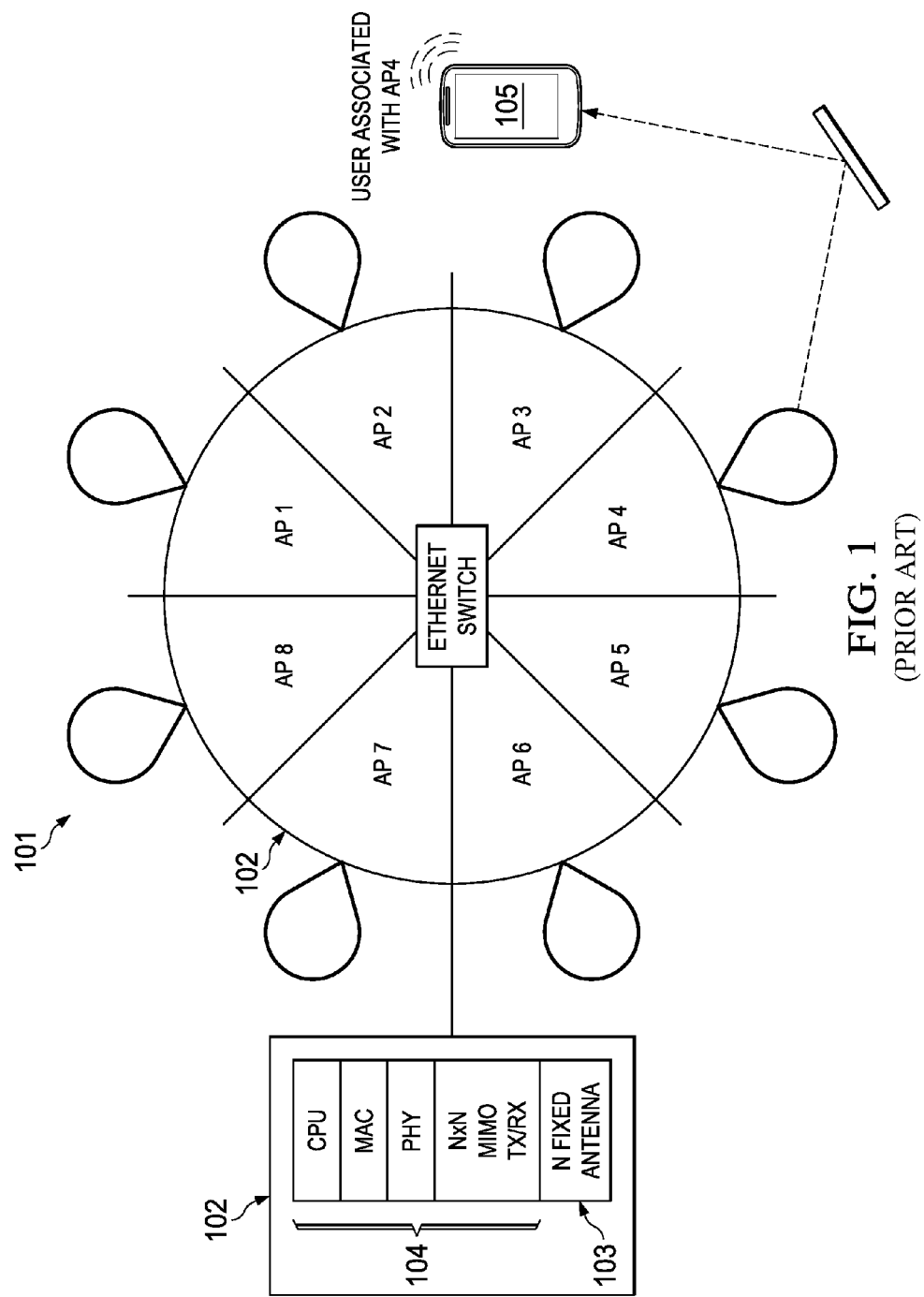
FIG. 1 is a conventional architecture for integrating a multiplicity of radios to expand the raw capacity of a WiFi AP.

Integrating a multiplicity of radios can expand the raw capacity of a WiFi access point. An architecture for achieving such is shown in FIG. 1. This architecture provides method and means for scaling up the capacity of an AP unit by adding more sectors, radios and antennas. The architecture consists of a unit comprising a circular array of access points 101, with each individual access point 102 dedicated to a fixed sector, with each sector provisioned with a fixed directional MIMO antenna array 103 and a unitary radio 104. This architecture discloses means to isolate the RF from one sector and its two adjacent sectors and non-adjacent sectors to allow each sectorized access point to operate independently.

Operationally, in the WiFi mode of operation, this architecture would be configured so that each sector would provide radio service in a particular WiFi spectral band, either 2.4 GHz or 5 GHz band, with a maximum transmit power and a particular channel of 20 MHz width or bonded-channel of 40 MHz or 80 MHz or even 160 MHz within the chosen spectral band, whilst operating in 802.11a, 802.11b, 802.11g, 802.11n or 802.11 ac modes (hereafter also referred to as 802.11x), consistent with the various modes of operation permitted by the IEEE 802.11 standard. However, whilst offering capacity expansion, this architecture has particular limitations to its scalability and flexibility for reconfiguration.

Each sectorized AP of the array comprises a dedicated radio and radio chain to antennas, e.g. to provide 3×3 MIMO operation requires a unitary radio and 3 dedicated antennas. Each radio is permanently affixed to a dedicated antenna array to service a fixed sector, and can provide radio service to that sector only, and in a configuration that is 802.11x, preferentially in MIMO operating mode if the radio is so capable. Because there is only one radio dedicated to a sector, a sector can provision service only on one wireless channel at a time, or conversely, one sector can only be assigned one dedicated channel at a time. By permanently dedicating a radio to a particular sector, the radio resource of that sector cannot be reassigned to another sector that may be servicing a spatial region that has more users and requires more data throughput provisioning. The raw cumulative data handling capacity of the unit is directly proportional to the number of sectors, and thus the physical size of the unit is expansive with number of sectors.

The directional antennas radiate and receive from an angular arc that is prescribed by the width of the sectors. A user 105 might not associate with the AP which is geometrically the closest or that offers the best link quality due to various factors such as load balancing between radios, the radio configurations in the different sectors and the user device capabilities. In an indoor mode of operation, in a radio scattering rich environment, the AP to user wireless link would be achieved for radiating sectors not in the line of sight of the client device user but by multi path reflections r. However, the average link quality would be lower than for the closest AP due the longer propagation path and additional RF signal absorption for each multipath reflection. The wireless link statistics achieved by the same AP unit disclosed in the architecture of FIG. 1 if it were translocated to an outdoor environment, in which there is low scatter and multipath, would be very different. In an outdoor low built up environment, being a lower multipath environment than the indoor environment, a user might likely only have a functional wireless link with the AP radio that is in direct line of sight.

The traffic or usage on one side of an AP unit can be different to that in another side of an AP unit. In this circumstance, the architecture of FIG. 1 comprising multiple sectorized APs, and particularly when the deployment of such a multiple sectorized AP unit is in a location where there is low multipath, leads to non-optimal usage of the cumulative radio resources in the unit. One side of the unit may be overloaded with users, whilst the other side is under-utilized.

Figure 2A:
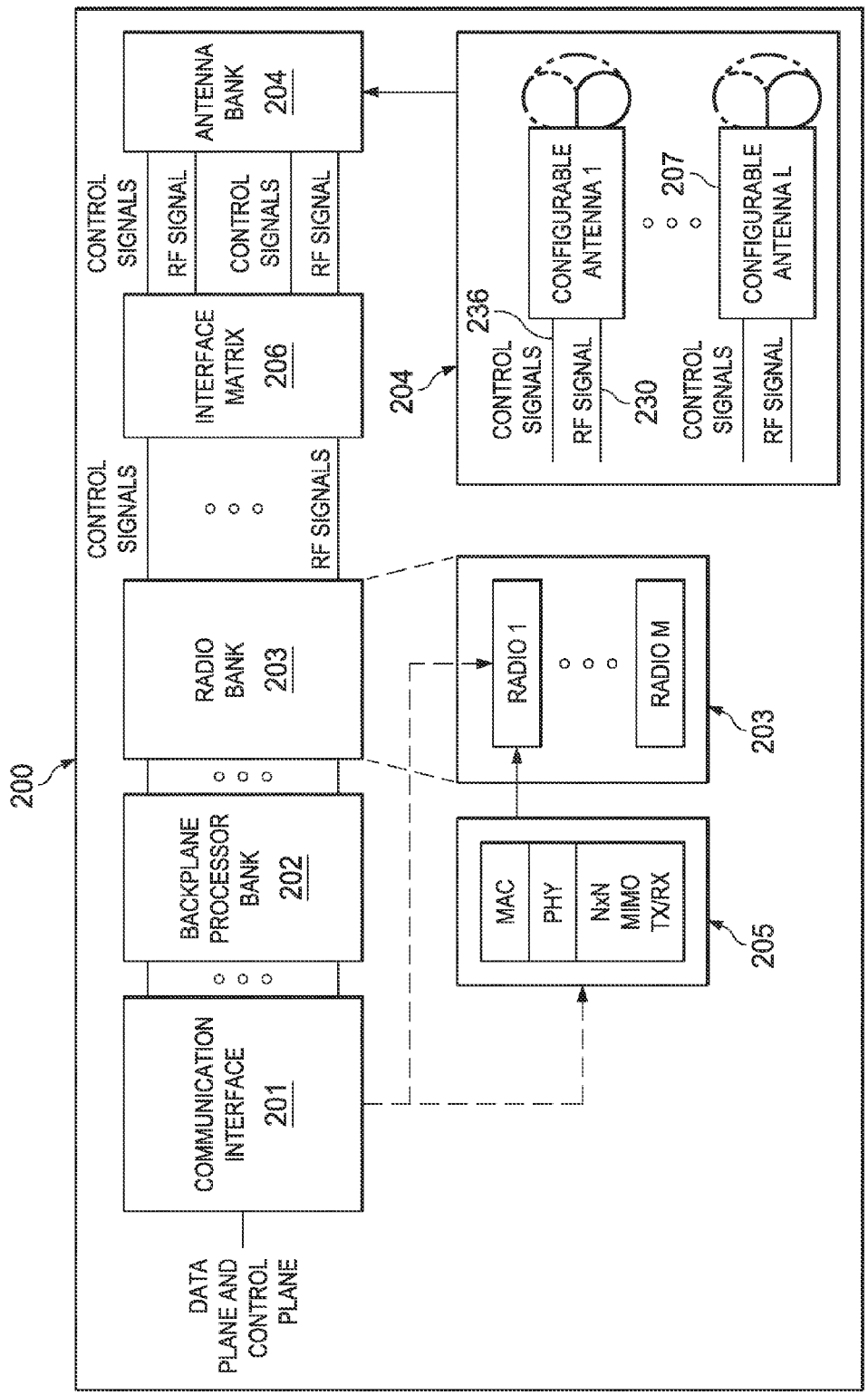
FIG. 2A is a block diagram of a universally flexible AP architecture according to one implementation.

FIG. 2A is a block diagram of a universally flexible AP architecture 200. In some implementations, the universally flexible AP architecture 200 includes: (1) a communication interface 201; (2) a multiplicity of processors in a backplane processor bank 202; (3) a radio bank 203 comprising a multiplicity of radios 205 that are preferentially MIMO radios which can be dynamically assigned to a multiplicity of independently configurable antennas 207; (4) an interface matrix 206 to dynamically interconnect the multiplicity of MIMO radios 205 in the radio bank 203 to the multiplicity of configurable antennas 207 in the antenna bank 204; and (5) an antenna bank 204 comprising a multiplicity of configurable antennas 207 which can be independently configured. The architecture 200 implements a method of dedicating and rededicating the assignment of specific radios 205 to specific configurable antennas 207 and configuring the configurable antennas 207 so assigned. It is a feature of the configurable antennas 207 that each antenna is independently configurable to emit directive RF into one spatial sector, and alternatively configured to radiate into a different spatial sector, or alternatively configured to radiate and the sector being defined by the beam pattern of said antenna.

The communication interface 201 provides the interface between the processors in the processor bank 202 and the backbone network. The communication interface is used to receive and transmit from the backbone network the control plane information to control and manage, via the processor bank 202, the universally flexible AP 200 and the data plane information to be transmitted to or received from the users connected to the universally flexible AP 200. A particular embodiment of the communication interface 201 is an Ethernet switch connected to an optical or twisted pair Ethernet physical interface. Another embodiment is an Ethernet switch connected to a DOCSIS cable modem. Another embodiment of the communication interface 201 is a Common Packet Radio Interface (CPRI).

The backplane processor bank 202 consists of a multiplicity of processors. The processors are used to implement the local or distributed functions for the management of the mandatory and optional functions of the radios, the local or distributed functions of the wireless network controller, and the local or distributed functions of a means of dedicating and rededicating the assignment of specific radios to specific antennas and configuring the antennas. The processors also implement the necessary communication protocols to interface with the other network elements in the wireless backbone network and wireless client devices.

The radio bank 203 consists of a multiplicity of radios 205. The various parameters of each radio in the radio bank, such as TX power, channel, bandwidth, SSIDs, security, etc., can be independently configured. Each radio comprises a multiplicity of transceivers, and optionally all or parts of the physical layer baseband signal processing, of the link layer functions and of the multiple access control layer functions. Each radio in the radio bank can also belong to different wireless technologies such as 802.11a/b/g/n/ac/ad, GSM, WCDMA, LTE, 802.16, 802.22, proprietary or standardized wireless backhaul technologies, etc. Each radio interfaces with a processor in the processor bank 202. More than one radio can interface with a processor. In some particular cases, the radio can interface directly with the communication interface 201. A particular embodiment of a radio that may be used in this architecture is a PCIe WiFi module card.

The interface matrix 206 interconnects the RF ports from the multiplicity of radios 205 to the ports of the multiplicity of configurable antennas 207. The interconnections are set up dynamically as a function of the control signals from the multiplicity of processors in the processor bank 202 and/or multiplicity of radios in the radio bank 203. The interface matrix also interconnects some of the control signals to the control ports of the multiplicity of configurable antennas 207. The interface matrix 206 can enable the interconnections from all, part or a single RF ports of the radios 205 in the radio bank 203 to all, part or a single configurable antenna 207 ports. In one extreme case, the interface matrix 206 can enable the interconnection of any RF port of the multiplicity of radios 205 in the radio bank 203 to any port of the multiplicity of configurable antennas 207 in the antenna bank 204. For the other extreme case, the interface matrix consists of fixed interconnections between a RF port from a radio 205 and a port for a reconfigurable antenna 207.

The antenna bank 204 comprises a multiplicity of configurable antennas 207. Each configurable antenna 207 has a RF signal port and, optionally, a control signals port. Each configurable antenna 207 in the antenna bank 204 can be independently configured. Each configurable antenna can also have different characteristics such as operating band, radiation pattern beamwidth, antenna gain, number of radiation patterns, continuous or discrete beam steering, polarization type, fixed or switched orthogonal polarization, etc.

A particular embodiment is an antenna bank comprising a multiplicity of fixed directive antennas, or steerable directive antennas, or antennas for which the radiation pattern and/or the polarization can be reconfigured in real-time, or any combinations of those antennas. In this case, the universally flexible AP 200 architecture illustrated in FIG. 2A is a sectorized access point unit comprising a multiplicity of sectors determined by the independent configuration of the multiplicity of antennas 207. The coverage (beamwidth, main sector angle and transmit power) of the multiplicity of sectors can be changed dynamically by the method of dedicating and rededicating the assignment of specific radios to specific antennas and configuring the antennas. The multiplicity of sectors can overlap or not overlap. The multiplicity of radios can be dynamically assigned to a multiplicity of antennas, in one or more than one sector.

The use of travelling wave antennas of the form described herein enables a compact planar array design with low power consumption for the antenna bank 204. A multiplicity of travelling wave analog antennas, such as employed in an array, can provide the requisite functionality of a directive beam from each antenna that can be configured to switch to an alternative beam. It will be recognized that any analog or digital beamforming antenna array with said characteristics of being composed of fixed directive, directive and steerable, directive and switchable to another radiative angle would provide a configurable antenna array suitable for the antenna bank 204. A preferred characteristic of the antenna bank is that it is composed of a multiplicity of low profile planar antenna arrays wherein each array comprises a multiplicity of fixed directive antennas, or steerable directive antennas, or antennas for which the radiation pattern and/or the polarization can be reconfigured in real-time, or any combinations of those antennas.

A particular embodiment of the configurable antenna 207 for use in the antenna bank 204, is travelling wave antennas, such as passive leaky wave antennas, electronic leaky-wave antennas, end-switch passive leaky wave antennas, and end-switch electronic leaky-wave antennas, said antennas being microstrip form of antennas. By way of exemplification, a leakywave antenna that is directive, steerable and switchable, are described in publication: "Beam-switchable scanning leaky-wave antenna" Electronics Letters, 30 Mar. 2000, Vol. 36, no. 7, pg. 596-7 and "Performance-Enhanced and Symmetric Full-Space Scanning End-Switched CRLH LWA", *IEEE Antennas and Wireless Propagation Letters*, Vol. 10, 2011, p. 709-712 and described variously in D. R. Jackson, C. Caloz, and T. Itoh, "Leaky-wave antennas," *Proc. IEEE*, vol. 100, no. 7, pp. 2194-2206, July 2012.

FIG. 2B illustrates how a passive leakywave antenna 229 can be employed to provide sectorized switching into two sectors using end-switching using a single pull double throw switch 237 state controlled by the control signal 236. A particular embodiment of configurable antennas 207 is the leakywave antenna (LWA) a passive leakywave antenna which is a class of travelling wave waveguide antenna that radiates at an angle that can be selected by design and fabrication. The passive leakywave antenna is a symmetric microstrip waveguide that is a two port device. Because said antenna is symmetric said antenna can be signal coupled from either of the two end ports of the waveguide and will radiate at a specified angle. By coupling RF signal 230 into one port 231 of a passive leakywave antenna 229 the beam can be made to radiate at an angle −a 232 measured from antenna broadside 239 as described in FIG. 2B. The angle a can be either positive or negative depending on the passive leakywave antenna 229 design. By coupling the signal to the alternative port 233, the beam will radiate at an angle a 234 measured from antenna broadside 239. This two port switching provides two sectors defined by the arc width 240 of the radiated beam in each sector. The arc width 240 of the radiated beam in each sector is determined by the leaky wave transmission line 229 length 238. By design of the antenna, the radiation patterns 232 and 234 of the two sectors can be made to overlap or not overlap. In this manner two sectors can in combination cover the full 180° or half-space. The leakywave antenna is microstrip antenna constructed on a ground plane 235, and this prevents substantial radiation from backside lobes into the substrate of the device. A duality of passive leakywave antennas 229, back to back, but not necessarily conjoined back to back, can provide full 360° space coverage, with four sectors.

FIG. 2C shows two alternative embodiments of configurable antennas. The alternative embodiments use the same structure as described in FIG. 2B except that the single pull double throw switch 237 is replaced by a splitter/combiner 241 and two absorptive single pull single throw switches 242 and 243 for the alternative design 1 and two reflective single pull single throw switches 244 and 245 for the alternative design 2. By appropriately selecting the switches control signals 236, the RF signal 230 can either be coupled to port 1 231 to radiate at an angle −a 232, or coupled to port 2 233 to radiate at an angle a 234, or simultaneously coupled to port 1 231 and port 2 233 to simultaneously radiate at an angle −a 232 and at an angle a 234.

An alternative embodiment of 207 is the electronic leaky-wave antenna, in which steering of the beam with backfire-to-endfire capability can be established by electronically altering the properties of the travelling wave guide of the leaky wave antenna, and is described in Liu, L., C. Caloz, and T. Itoh, "Dominant mode leaky-wave antenna with backfire-to-endfire scanning capability," *Electronics Letters*, Vol. 38, 1414-1416, 2002.

Polarization diversity can be realized because the LWA can be excited by two modes, common and differential. If the LWA is excited in common-mode, then horizontal polarization is achieved, and if the LWA is excited in differential-mode, then vertical polarization is achieved. Thus, either horizontal or vertical polarization is achieved in one angular direction based on the LWA's frequency. If the RF frequency is changed, then the angular direction changes. For example, if the LWA is excited in common-mode in the LH region, then a backward beam is radiated with horizontal polarization, and if the LWA is excited in differential-mode in the RH region, then a forward beam is radiated with vertical polarization. Thus, a sector as defined by the arc of one beam, can be serviced with an alternate beam, at the same RF frequency, and if the mode isolation is sufficient this one sector can have two data streams at the same RF frequency that are sufficiently distinguishable for data communications applications.

A further embodiment of the antenna bank 204 is an array constructed from a multiplicity of passive leakywave antennas or electronic leakywave antennas or a combination of these configurable antennas that have an alternative, preferentially orthogonal, polarization. An example of a 4-port LWA capable of providing either vertical or horizontal polarization in one quadrant is described in M. R. Hashemi and T. Itoh, "Dual-Mode Leaky-Wave Excitation in Symmetric Composite Right/Left-Handed Structure with Center Vias". Microwave Symposium Digest (MTT), 2010 IEEE MTT-S International, vol., no., pp. 9, 12, 23-28 May 2010IMS2010.

It will be understood that a multiplicity of antennas 207, being LWA's in general, and either passive leakywave antennas or electronic leakywave antennas, can be fabricated as a plurality of configurable antennas as arrays on a common printed circuit board, and or a multiplicity of said arrays can be fabricated on a multiplicity of printed circuit board and assembled or conjoined, to construct the antenna bank 204. In a preferred embodiment of the universally flexible AP 200, the physical elements 201, 202, 203, 205 are internalized in the physical body of the unit 200, and 204 is internal to the unit to achieve the maximum compactness of the unit whilst provide the requisite spatial beam coverage desired for the unit 200.

Figure 3:
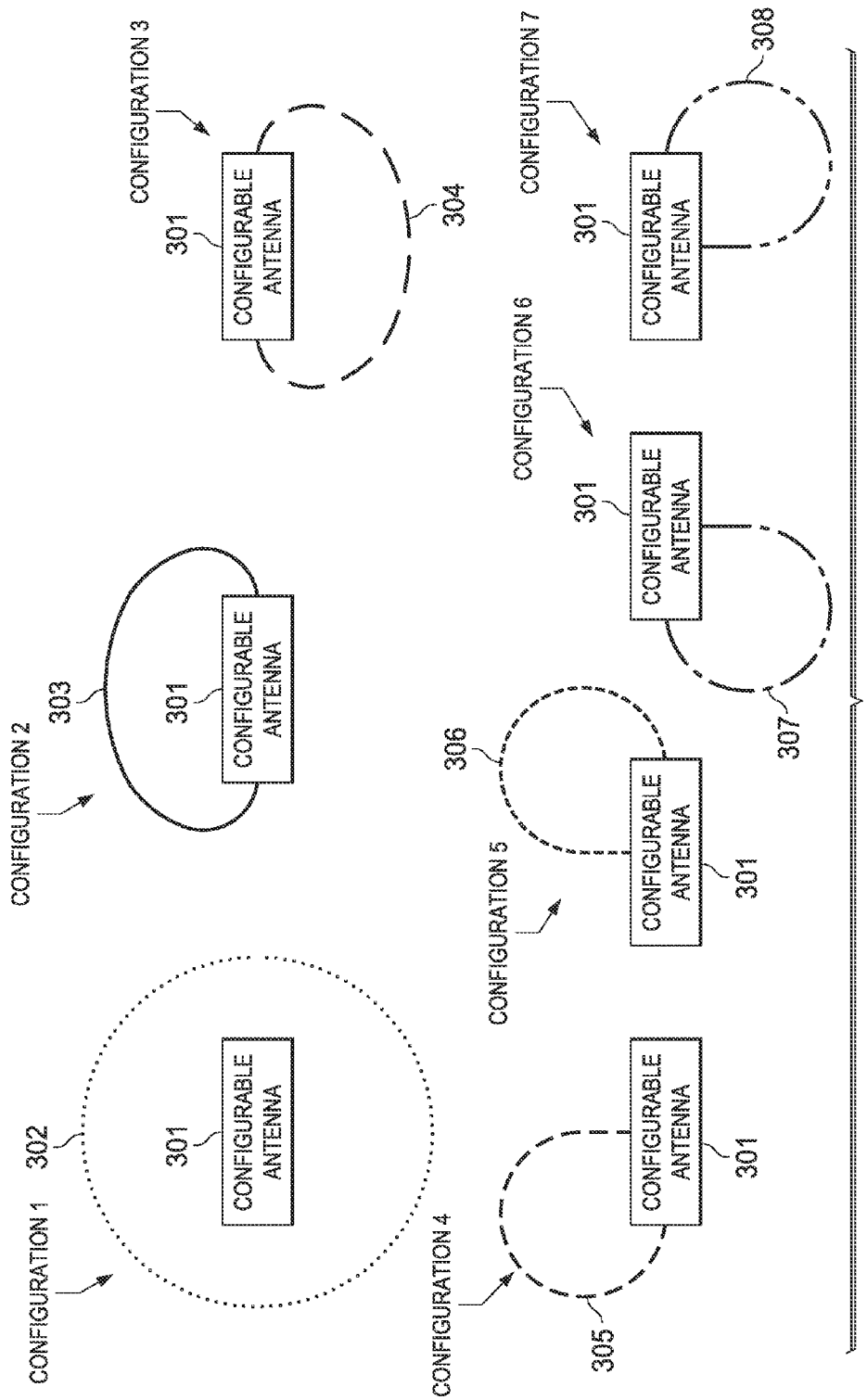
FIG. 3 shows different radiation patterns of a configurable antenna.

FIG. 3 shows the different radiation patterns of a configurable antenna 301 (207 in FIG. 2) for which the radiation pattern can be reconfigured in real-time via the control signals to one of the seven configurations 302 to 308. Furthermore, the polarization state of the configurable antenna can be changed to either vertical or horizontal, or +45° or −45°, for each of the seven configurations 302 to 308. It will be understood that the configurable antenna 207 can be configured to any number of prescribed configurations, limited only by the configurations achievable by the specific antenna technology employed in the configurable antenna 207.

The total number of configurable antennas 207 in the antenna bank 204 can differ from the number of radios in the radio bank 205. The number of configurable antennas assigned to each radio 205 in the radio bank 203 can differ. The characteristics and configuration of each configurable antenna 205 assigned to a radio 203 can differ. The number of sectors provisioned by the universally flexible AP 200 can differ from the number of radios 205 in the radio bank 203. The number of sectors can also differ from the number of configurable antennas 207 in the antenna bank 204. Each sector or more than one sector may have individual SSIDs, or all sectors may have a common SSID.

By way of generalization, a universally flexible AP 200 unit will have S sectors, and M radios in the radio bank 203, L configurable antennas 207 in the antenna bank 204 and Lm reconfigurable antennas assignable to radio m. It is a specific feature of the universally flexible AP 200 that more than one radio 205 and more than one configurable antenna 207 is able to provide simultaneous radio service to one sector or more than one sector. This configuration thus permits multiple concurrent radios providing multiple radios of the same technology providing differentiated services on the same band. By way of example, with S=4 sectors, and two pairs of radios per sector, and all radios operate on the same band, e.g. the 5 GHz WiFi band, this allows first sector to concurrently provide service on two non-overlapping channels in the same band, the second sector to concurrently provide service on two non-overlapping channels in the same band, the third sector to concurrently provide service on two non-overlapping channels in the same band and the fourth sector concurrently provide service on two non-overlapping channels in the same band. It will be understood that the dedication and rededication of radios from one sector to an alternative sector is established by the interface matrix 206 or by reconfiguring the configurable antennas 207 and permits load balancing of the universally flexible AP. It is thus a distinguishing feature of the universally flexible AP that fewer sectors are required to provide the same capacity, for example 4 sectors with 2 radios per sector operating on two isolated channels in the same band would be concurrently operated, whereas in the prior art 8 sectors with a unitary radio per sector would be required for concurrent operation of all radios in the same channel plan.

A wireless access device manager implements the method of dedicating and rededicating the assignment of specific radios to specific antennas and configuring the antennas. Hereinafter, the wireless access device manager is also referred to as a hypervisor. The hypervisor can be implemented in software, hardware or a combination of software and hardware. The hypervisor can be implemented as instructions stored on a non-transitory, computer-readable storage medium (e.g., memory, hard disk, flash), which, when executed by one or more hardware processors of, for example, a server computer, causes the one or more hardware processors to perform operations. These operations include but are not limited to: optimally assigning and configuring the multiplicity of radios 205 in the radio bank 203, the interface matrix 206, the multiplicity of configurable antennas 207 in the antenna bank 204, and the association of a wireless device to a radio 205 in the radio bank 203 to maximally utilize the available spectrum, provide optimal use of the radio resources and deliver a multitude of network services. The hypervisor bases its decision upon one or more inputs such as, the measured RF signals at a multiplicity of radios 205 from a multiplicity of other radios, the traffic and quality of service requirements from the user, the network configuration and coverage required from the service provider, the capabilities of the multiplicity of radios 205 in the radio bank 203, the number of radios 205 in the radio bank 203, the capabilities of the interface matrix 206, the capabilities of the multiplicity of configurable antennas 207 in the antenna bank 204, the number of configurable antennas 207 in the antenna bank 204, the capabilities of the wireless devices that want to connect to the radios, etc. The information used by the hypervisor to make its decision can pertain to the universally flexible AP 200 where the hypervisor is implemented or from a multiplicity of other universally flexible AP 200, or a combination of both. The hypervisor can be implemented entirely locally in the bank of processors, or in a distributed implementation over a multiplicity of universally flexible AP 200 arranged in a cluster and, optionally, on a remote server. When the entirety of parts of the hypervisor functions are implemented in a multiplicity of other universally flexible AP 200 or a remote server, the communication interface and the processors are used to receive and interpret the messages from the other network entities, and to send messages from the universal flexible AP 200 to the other network entities.

One can appreciate that using the disclosed universally flexible AP 200 architecture illustrated in FIG. 2A where, as a particular embodiment, each antenna 207 is a configurable antenna with the radiation patterns illustrated in FIG. 3, and each radio is a WiFi 802.11n radio can overcome all the limitations of the prior art. One can also appreciate that the disclosed architecture is flexible and scalable: capacity and features can be customized to different deployment and customer requirements. The universally flexible AP 200 concept offers unlimited configuration possibilities: the AP architecture is no longer a limitation for the deployment of new services and maximum spectrum utilization.

We now disclose specific examples of embodiment, by way of illustration, to show the flexibility of the architecture disclosed.

Figures 4, 6:
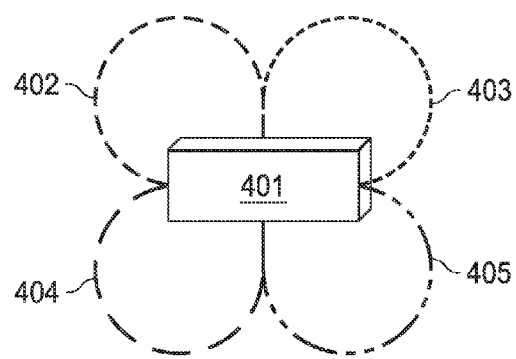
FIG. 4 is a block diagram of universal AP unit configuration.
FIG. 6 illustrates possible configurations of a universal AP unit.
Figure 5:
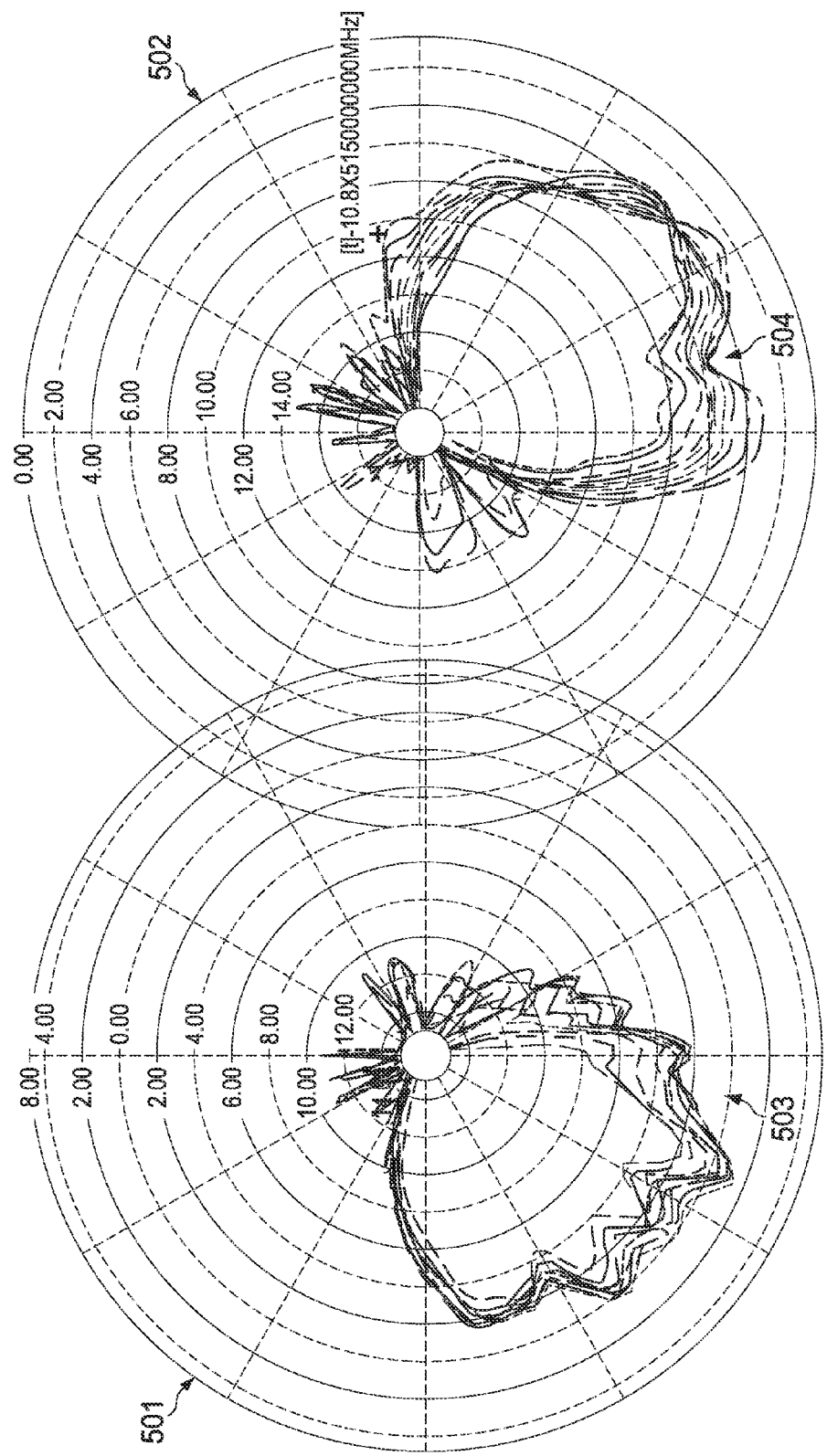
FIG. 5 illustrates antenna radiation patterns.

In the universal AP unit 401 configuration described in FIG. 4, the universally flexible AP unit 401 has S=4 spatial sectors 402 to 405, M=8 radios and L=22 configurable antennas. All radios are 802.11n radios. The processor bank consists of four processors and the communication interface is a 1 GbE physical port with an Ethernet switch. In this embodiment the antenna bank is separated into two arrays: one in the front of the unit and the other in the back of the unit. Each antenna array comprises of 11 configurable antennas, two of which operate in the 2.4 GHz band and nine operating in the 5 GHz band. Each antenna array's configurable antennas can generate the radiation patterns 501 and 502 illustrated in FIG. 5. The broadside angle is at the bottom of each radiation pattern (503 for radiation pattern 501 and 504 for radiation pattern 502). The interface matrix is a unitary interface matrix consisting of fixed interconnections and the possible universal AP configurations are given in FIG. 6.

The hypervisor for this particular embodiment can implement a multiplicity of configurations. For example, four radios can be enabled and the multiplicity of configurable antennas configured such that a single 5 GHz radio cover each of the sector 402 to 405. Another example is to enable the eight radios, and configure the multiplicity of configurable antennas such that there are two radios covering each sector 402 to 405. The configuration of the two radios associated with a multiplicity of configurable antennas configured to cover the same sector can differ. In another example, the eight radios are enabled and the multiplicity of configurable antennas are configured such that three radios are associated with a multiplicity of configurable antennas configured to cover the front right sector 404, one radio is associated with a multiplicity of configurable antennas configured to cover the front left sector 405, three radios are associated with a multiplicity of configurable antennas configured to cover the back right sector 402 and one radio is associated with a multiplicity of configurable antennas configured to cover the back left sector 403. The configuration of the radios can differ. One can appreciate that this embodiment offers a large number of possible configurations to adapt the universally flexible AP 401 unit's resources to meet instantaneous traffic demand, efficiently manage network interference and exploit available spectrum and minimize unit power consumption. The universally flexible AP 401 unit can be configured to have a multiplicity of radios associated with a multiplicity of configurable antennas configured to cover the same sector 402 to 405 and configured for different services and capabilities.

Figure 7:
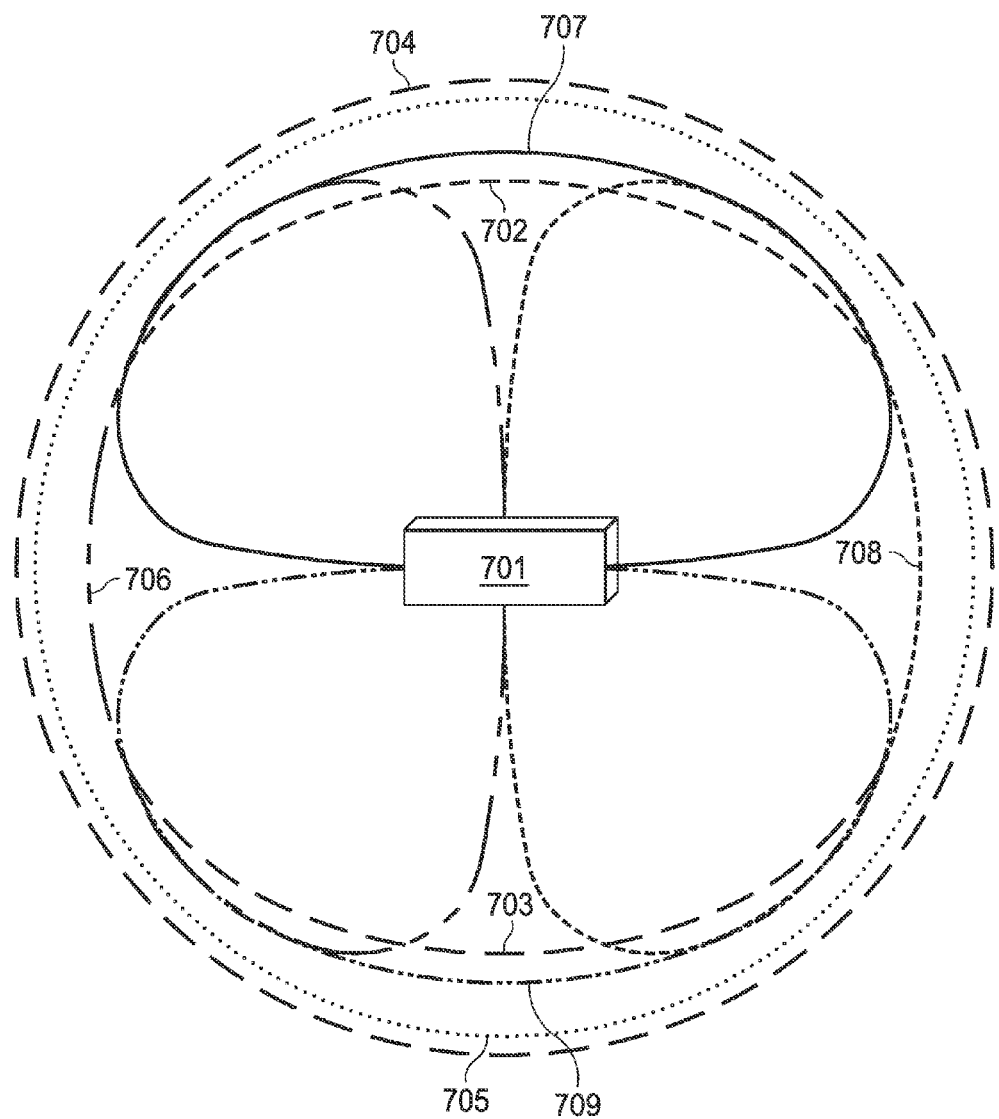
FIG. 7 shows another embodiment of the universally flexible AP unit.
Figures 8, 9:
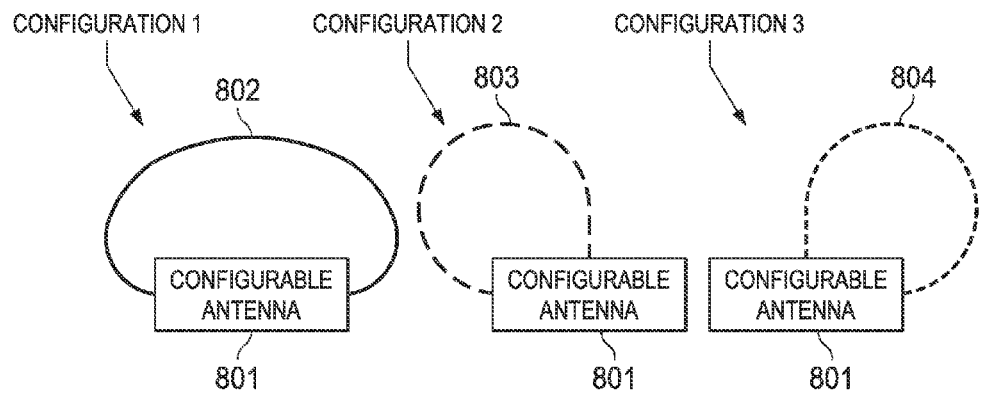
FIG. 8 shows configurations of configurable antennas.
FIG. 9 shows an example configuration of a universal AP unit.

Another embodiment of the universally flexible AP 701 unit is illustrated in FIG. 7. It consists of M=8 radios, two of which are WiFi 802.11n radios and six 802.11ac radios. The antenna bank consists of L=22 antennas. Two groups of two configurable antennas 801 (207 in FIG. 2) operate in the 2.4 GHz band and each provides the three configurations 802 to 804 illustrated in FIG. 8. The radiation patterns 802 of the two groups of configurable antennas when installed in the universally flexible AP 701 are offset by 180° each. The radiation pattern corresponding to the radiation pattern 802 is illustrated by the radiation pattern 702 and 703, respectively for each of the two groups of two configurable antennas 801. Two groups of three configurable antennas 301 operate in the 5 GHz band and each provides the seven configurations 302 to 309 illustrated in FIG. 3. The radiation pattern corresponding to the radiation pattern 302 is illustrated by the radiation pattern 704 and 705, respectively for each of the two groups of three configurable antennas 801. Four groups of three configurable antennas 801 operate in the 5 GHz band and each provides the three configurations 802 to 804 illustrated in FIG. 8. The radiation patterns 802 of the four groups of configurable antennas when installed in the universally flexible AP 701 are offset by 90° each. The radiation pattern corresponding to the radiation pattern 802 is illustrated by the radiation pattern 706, 707, 708 and 709, respectively for each of the four groups of three configurable antennas 801. The processor bank consists of four processors and the communication interface is a 10 GbE physical port with an Ethernet switch. An example of unit configuration is given in FIG. 9. The unit can be configured to have a multiplicity of radios associated with a multiplicity of configurable antennas configured to have overlapping angular region of coverage and configured for different services and capabilities.

Figure 10:
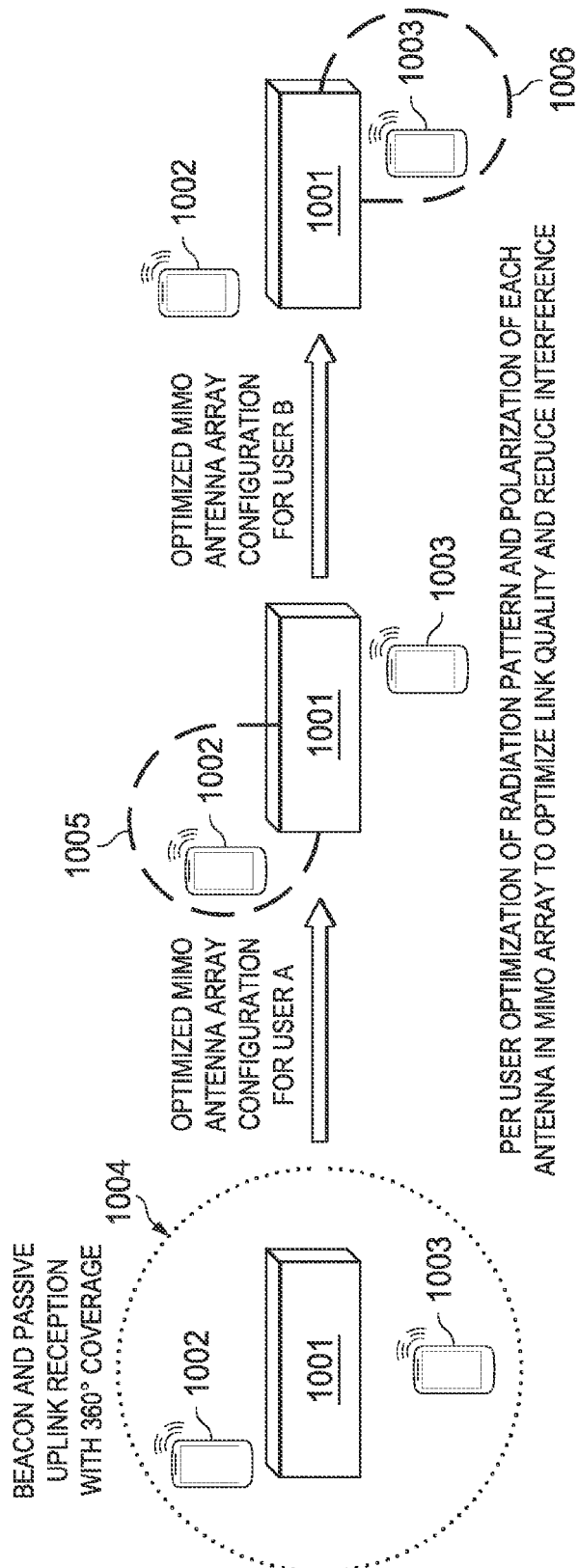
FIG. 10 illustrates the configuration of one of the three antennas.

A particularity of this embodiment is that the hypervisor can configure the multiplicity of configurable antennas for each transmission or reception. By way of an example, each of three configurable antennas 301 assigned to radio 8 of the universally flexible AP 1001 can be configured with one of the seven configurations 302 to 308 illustrated in FIG. 3. To simplify the explanation, it is appropriate to only consider the configuration of one of the three antennas as illustrated in FIG. 10. For the beacon or passive uplink reception (i.e., reception from a non-targeted user) the configurable antenna is configured with configuration I 302 in FIG. 3. Radio 8 thereby provides 360° radiation pattern 1004 coverage. When transmitting to or targeted reception from a given user, the configurable antenna 301 can be configured with any of the seven configurations 302 to 308 and selected polarization to improve the link quality and decrease the network interference. For example, transmission to user A 1002 could use the optimal configurable antenna radiation pattern 1005 and transmission to user B 1003 could use the optimal configurable antenna radiation pattern 1006. For MIMO transmission, the multiplicity of antennas can be independently configured as per this example. As a way of example, for a 3×3 MIMO radio, transmission to user A 1002 could use the optimal configurable antenna radiation pattern 303 for the first configurable antenna 301 in the MIMO array, use the optimal configurable antenna radiation pattern 305 for the second configurable antenna 301 in the MIMO array, and use the optimal configurable antenna radiation pattern 308 for the third configurable antenna 301 in the MIMO array. Note that the possibility for the hypervisor to configure the multiplicity of configurable antennas for each transmission or reception is not limited to indoor environment and can be used in other environments such as outdoor, stadiums, urban environments, built up environments, arenas, etc. In particular, the hypervisor and universally flexible AP presents low up front installation cost burden, as the flexibility of the AP can adapt to installation site requirements.

Figure 11:
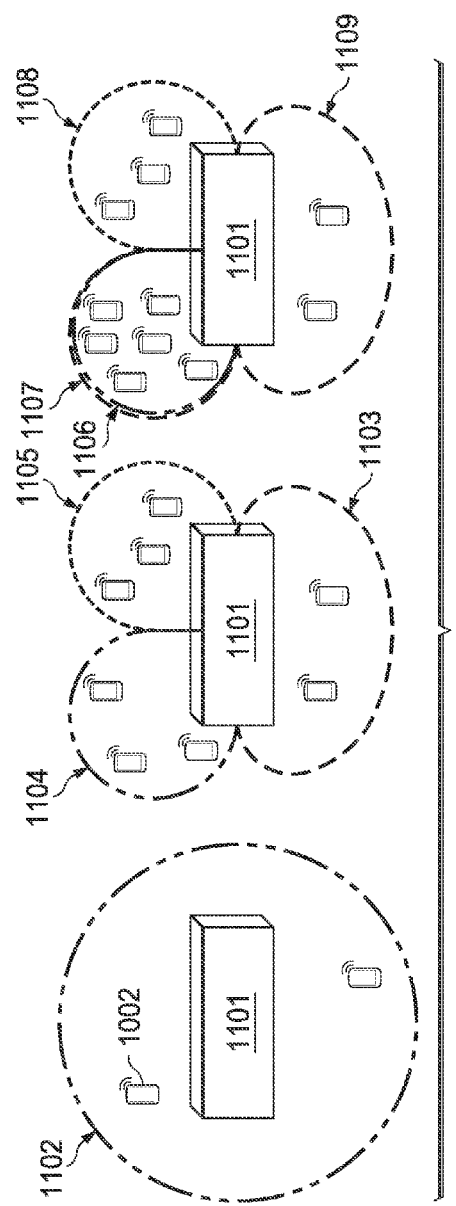
FIG. 11 shows how a hypervisor can be used to manage the radio and antenna banks of the universally flexible AP as a function of traffic demand and RF interference.

FIG. 11 shows how the hypervisor can be used to manage the radio and antenna banks of the universally flexible AP 1101 as a function of traffic demand and RF interference. In the case of low traffic volume a single radio associated with a multiplicity of configurable antennas configured with 360° coverage 1102 is used to decrease the network interference and decrease the universally flexible AP 1101 power consumption. As the traffic increases, the hypervisor can activate additional radios and optimize the configuration of the associated multiplicity of configurable antennas with the radiation patterns 1103 to 1105, as a way of example. For high traffic demand in a given direction, the hypervisor can also add several radios and configure the associated multiplicity of configurable antennas to radiate in the same sector 1106 and 1107 while the other radios are associated to a multiplicity of configurable antennas configured to cover the different sectors 1108 and 1109.

Figure 12:
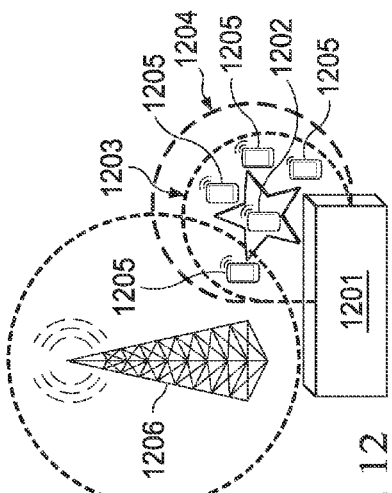
FIG. 12 illustrates how multiple radios in a sector can be used to provide differentiated services by a universally flexible AP.

FIG. 12 illustrates how multiple radios in a sector can be used to provide differentiated services by a universally flexible AP 1201. Best effort services or guest users 1205 are served on a radio associated with a multiplicity of configurable antennas configured to radiate in the sector 1203. This radio uses a channel which can suffer from higher interference from adjacent cells and/or other networks 1206 transmitting in the same channel band. The radio may also be configured to use a smaller bandwidth. Interference or high traffic volume does not prevent the provisioning of a connection to the users 1205 but decreases the offered quality of service to the users 1205. Meanwhile, differentiated users 1202 are served on a different radio associated with a multiplicity of configurable antennas configured to radiate in the sector 1204. This radio is configured to use a different channel with less interference, transmit with higher power, admits fewer users, admits only fast clients, and uses farther channel reuse. The differentiated users 1202 associated with this radio thus have higher Quality-of-Service (QoS) guarantees.

Figure 13:
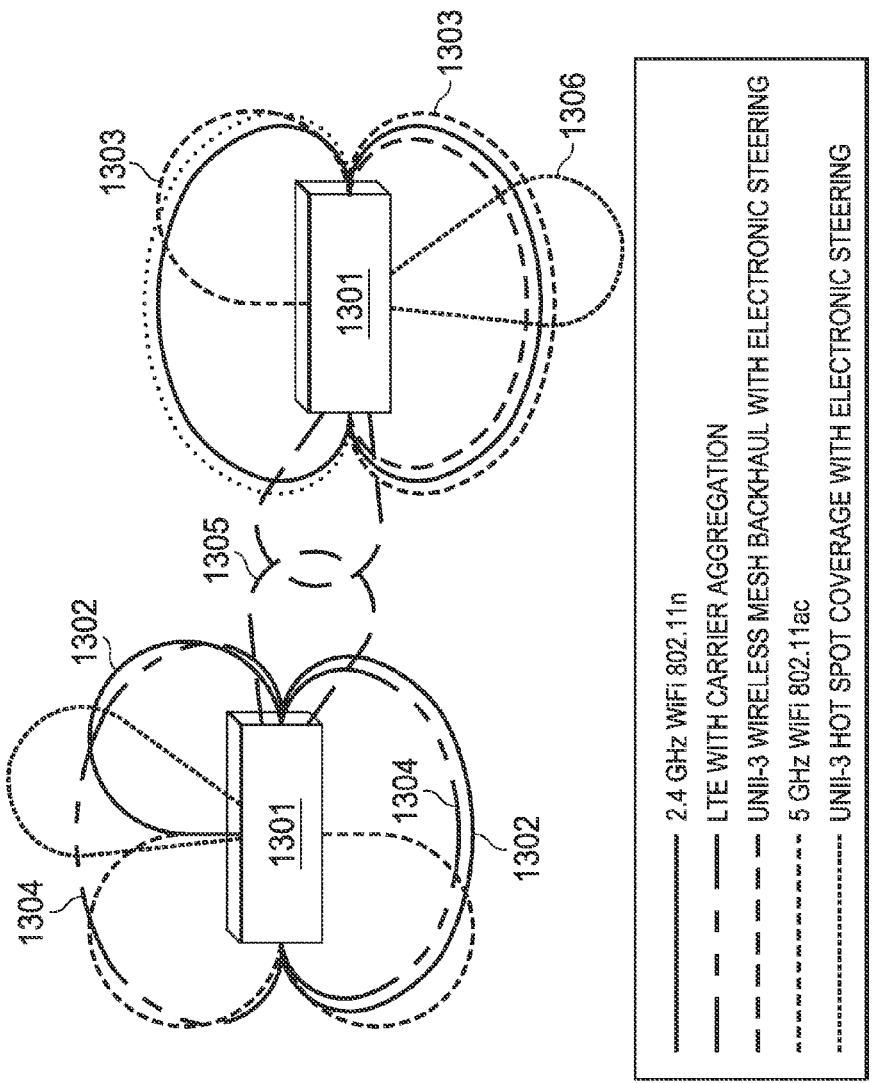
FIG. 13 is another embodiment of the universally flexible AP unit for outdoor use.

Another embodiment of the universally flexible AP 1301 unit is illustrated in FIG. 13 and is named the outdoor combo unit. This universally flexible AP 1301 outdoor combo unit integrates LTE, 2.4 GHz and 5 GHz WiFi, and wireless mesh backhaul technologies. The radio bank consists of two LTE radios, two WiFi 802.11n radios, two 802.11ac radios and two high power UNII-3 802.11 ac radios. The LTE radios can either be only the RF transceivers, in which case the radios acts as LTE remote radio head unit and they use a CPRI communication interface to receive and transmit samples, or implement, in conjunction with a multiplicity of processors, the complete functions and protocols required for functioning as a complete LTE small cell. The configurable antennas in the antenna bank consist of 2.4 GHz and 5 GHz configurable antennas, configurable antennas covering the 700-900 MHz and 1700-2100 MHz LTE bands, and narrowbeam electronically steering configurable antennas. An example of configuration of the coverage sectors 1302 to 1306 for the multiplicity of antennas for the different technologies for two universally flexible AP 1301 outdoor combo units are illustrated in FIG. 13 The narrowbeam electronically steering antennas can be used for wireless mesh backhaul 1305 between two or more universally flexible AP combo units 1301 using any suitable radio technology over the licensed or unlicensed band or to provide wireless coverage to regions of high service requirement such as hot spots or regions of poor coverage such as dead zones 1306. The unit can be configured to have overlapping coverage of radios configured for different services and capabilities and it can implement per-user radiation pattern and polarization selection to optimize link quality and minimize interference. Multi-technology implementations are not limited to outdoor environments and can be applied in other environments such as indoor, stadiums, urban, etc.

Figure 14:
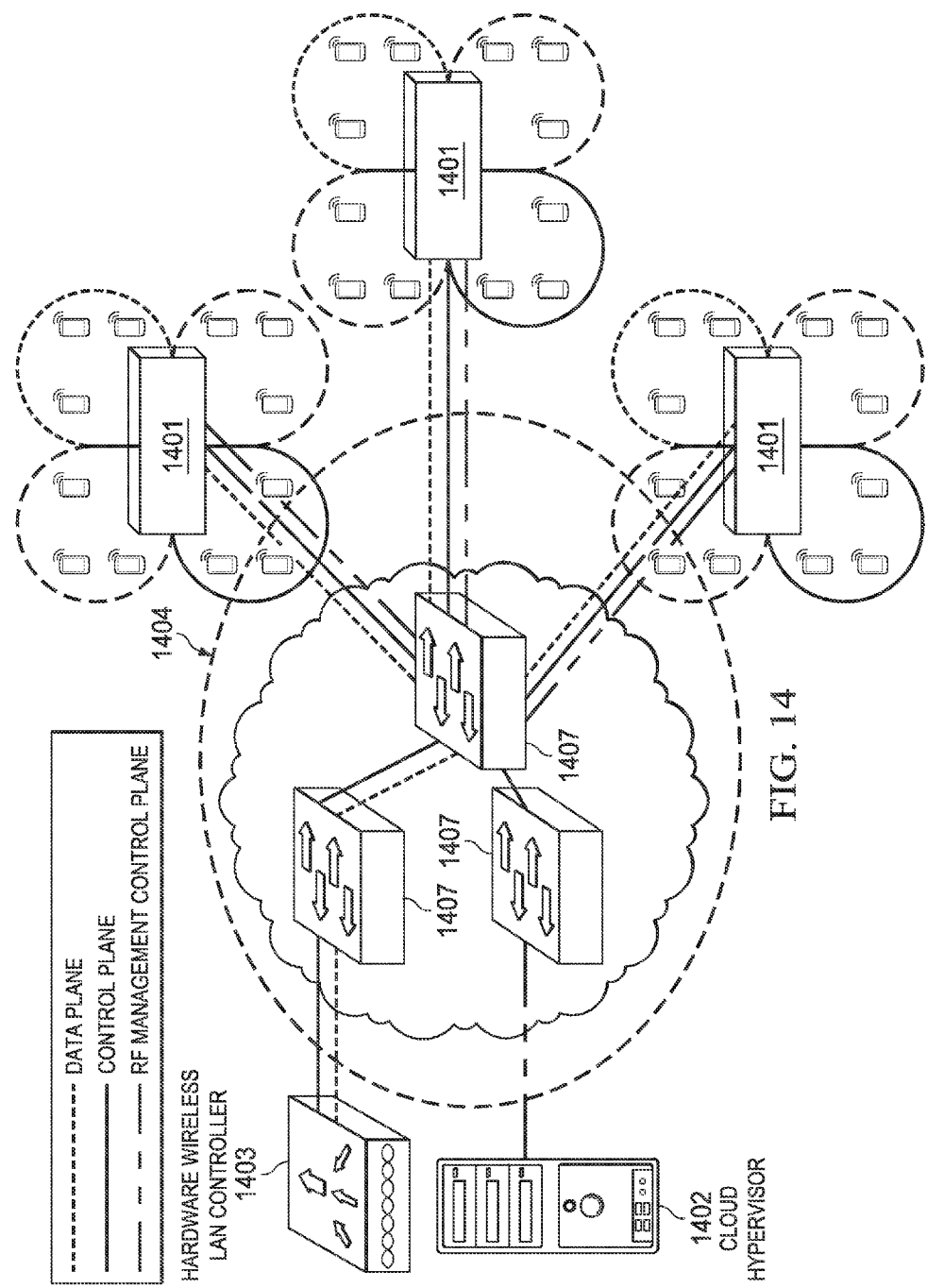
FIG. 14 illustrates an embodiment wherein the hypervisor is implemented in a cloud server and an optional hardware wireless LAN controller.

FIG. 14 illustrates an embodiment wherein the hypervisor is implemented in a cloud server 1402 and an optional hardware wireless LAN controller 1403. The cloud hypervisor 1402 receives messages concerning the traffic measurements, RF measurements, sessions services, client device capabilities, universally flexible AP's 1401 capabilities, universally flexible AP's 1401 current configuration, etc. transmitted over the backbone network 1404 typically containing common network elements such as switches or routers 1407 from a multiplicity of universally flexible AP's 1401. Based on this information and based on the service requirements from the network manager implemented for example in a hardware wireless LAN controller 1403, the hypervisor finds the optimal assignment of specific radios 205 to specific configurable antennas 207 and configuring the configurable antennas 207 so assigned in each of the universally flexible AP's. The cloud hypervisor 1402 then sends the radio bank 203, interface matrix 206 and antenna bank 203 configuration commands over the backbone network 1404 to the universally flexible AP's 1401.

Figure 15:
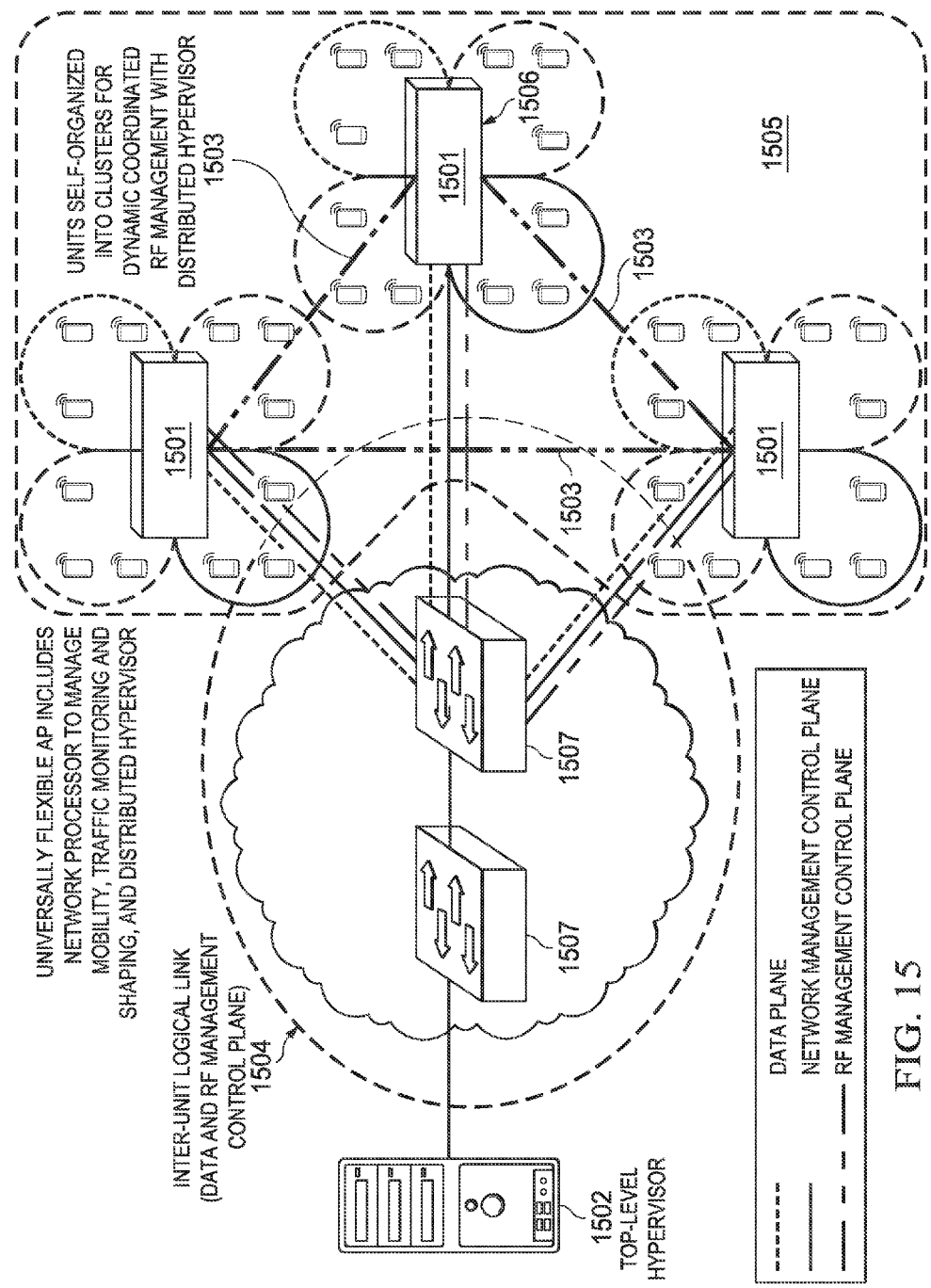
FIG. 15 illustrates an embodiment where the hypervisor is distributed in a cluster of universally flexible AP units and the top-level hypervisor functions are implemented in a cloud server.

FIG. 15 illustrates an embodiment where the hypervisor is distributed in a cluster 1506 of universally flexible AP 1501 units and the top-level hypervisor functions are implemented in a cloud server 1502. The top-level cloud hypervisor 1502 is responsible for top-level network configuration and monitoring. The following managing functions are migrated from the hardware wireless LAN controlled 1403 inside the universally flexible AP's 1501: mobility management, and traffic monitoring and shaping. The universally flexible AP 1501 units communicate which each other through virtual communication links 1503 established between the universally flexible AP's 1501 over the backbone network 1504 to implement a distributed hypervisor to support efficient management and configuration of the universally flexible AP's 1501 radio and antenna banks, and mobility management. Each universally flexible AP 1501 can learn the presence of universally flexible AP's 1501 in the network through broadcast messages in the backbone network 1504, from previously known neighbors universally flexible AP's 1501, through cloud controller information in the top-level hypervisor 1502, or over-the-air measurements. A multiplicity of universally flexible AP's 1501 organize themselves into a cluster 1505 and can select one of universally flexible AP's 1501 as the cluster head 1506.

In one possible embodiment of the distributed hypervisor implementation, the cluster head 1506 gathers messages concerning the traffic measurements, RF measurements, sessions services, client device capabilities, universally flexible AP's 1501 capabilities, universally flexible AP's 1501 current configuration, etc. transmitted from a multiplicity of universally flexible AP's 1501 in its cluster 1505. It can also receive the same or a subset of this information from other cluster head 1506 in the network or universally flexible AP's 1501 in the network or the top-level hypervisor 1502. The universally flexible AP 1501 units only report either directly or thought the cluster head 1506 essential information to the cloud top-level hypervisor 1502 (traffic for billing info, traffic profiles, unit status, etc.). Network configuration, user information, QoS level, etc. are provided by the cloud top-level hypervisor 1502 to the cluster head 1506. Based on this information, the hypervisor finds the optimal assignment of specific radios 205 to specific configurable antennas 207 and configuring the configurable antennas 207 so assigned in each of the universally flexible AP's 1501 in the cluster 1505. The cluster head 1506 then sends the radio bank 203, interface matrix 206 and antenna bank 203 configuration commands over the virtual links 1503 to the universally flexible AP's 1501 in the cluster 1505. It can also communicate this configuration or a subset of it to other cluster heads 1506 or universally flexible AP's 1501 in the network or the top-level hypervisor 1502 through the backbone network.

In another possible embodiment, there is no cluster head in the cluster 1505. Some or all of the universally flexible AP's 1501 in the cluster 1505 exchanges messages concerning the traffic measurements, RF measurements, sessions services, client device capabilities, universally flexible AP's 1501 capabilities, universally flexible AP's 1501 current configuration, etc. transmitted from a multiplicity of universally flexible AP's 1501 in its cluster. The universally flexible AP's 1501 in the cluster 1505 can also receive the same or a subset of the information from other cluster head 1506 or universally flexible AP's 1501 in the network or the top-level hypervisor 1502. Network configuration, user information, QoS level, etc. are provided by the cloud top-level hypervisor 1502 to the universally flexible AP's 1501. The universally flexible AP 1501 units only report essential information to the cloud top-level hypervisor 1502 (traffic for billing info, traffic profiles, unit status, etc.). Based on those information, the hypervisor instantiation in each universally flexible AP's 1501 in the cluster 1505 finds the complete or partial optimal solution for the assignment of specific radios 205 to specific configurable antennas 207 and configuring the configurable antennas 207 so assigned in the universally flexible AP's 1501 where the hypervisor instantiation is implemented, or a in multiplicity of universally flexible AP's 1501 the cluster 1505, or both, or in no universally flexible AP's 1501 the cluster 1505. The universally flexible AP's 1501 in the cluster 1505 then exchanges messages over the virtual links 1503 to optimally configure the radio bank 203, interface matrix 206 and antenna bank 203 of all universally flexible AP's 1501 in the cluster 1505. Some or all universally flexible AP's 1501 in the cluster 1505 can also communicate this configuration or a subset of it to other cluster heads 1506 or other universally flexible AP's 1501 or the top-level hypervisor 1502 through the backbone network.

A third embodiment is a hybrid of the two previous embodiments where there is a designated cluster head 1506 in the cluster 1505. The cluster head 1506 will implement a larger subset of the hypervisor functions, such as communication with other cluster head 1506 other universally flexible AP's 1501 in the network, or deciding the radios that will be enabled in all universally flexible AP's 1501 in the cluster 1505.

Figure 16:
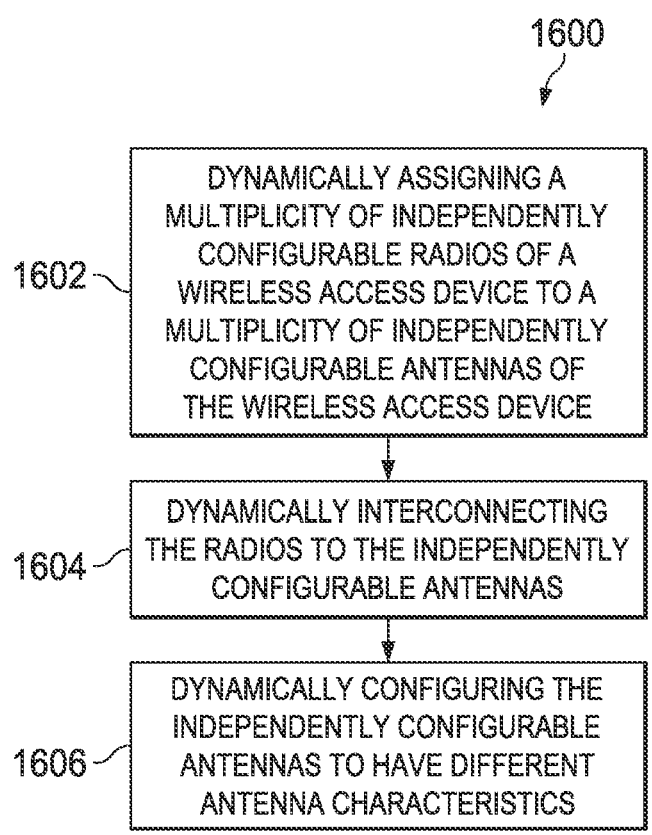
FIG. 16 is a flow diagram of an example process for configuring radio and antenna resources in a wireless system.

FIG. 16 is a flow diagram of an example process 1600 for configuring radio and antenna resources in a wireless system. Process 1600 can be implemented by architecture 200 described in reference to FIG. 2A.

In some implementations, process 1600 can begin by assigning, by one or more processors of a wireless access device, a multiplicity of independently configurable radios of the wireless access device to a multiplicity of independently configurable antennas of the wireless access device (1602), as described in reference to FIG. 2A. Process 1600 can continue by interconnecting (e.g., by an interface matrix of the wireless access device), the multiplicity of radios to the multiplicity of independently configurable antennas access (1604) as described in reference to FIG. 2A. Process 1600 can continue by configuring the independently configurable antennas to have different antenna characteristics (1606), as described in reference to FIG. 2A.

What is claimed is:

1. A wireless base station or access point comprising:
   a multiplicity of unitary radios, where each unitary radio includes a multiplicity of radio transceiver chains and each unitary radio is configured to transmit a data channel that is independent of data channels transmitted by other unitary radios; and
   a multiplicity of independently configurable antennas, where at least one of the configurable antennas has two ports and is a travelling wave antenna, a leaky wave antenna or a metamaterial leaky wave antenna, and where the at least one configurable antenna is excited in substantially orthogonal modes concurrently by coupling two or more radio transceiver chains of a unitary radio to one or both of the ports, and where the excitation of the configurable antenna radiates two or more different beams that transmit data from the data channel at substantially the same frequency.

2. The wireless base station or access point of claim 1, where the first port is coupled to two radio transceiver chains from a common unitary radio, and the second port is coupled to two radio transceiver chains from the common unitary radio.

3. A wireless base station or access point comprising:
   a multiplicity of unitary radios, where each unitary radio is comprised of a multiplicity of radio transceiver chains and each unitary radio is configured to transmit a data channel that is independent of data channels transmitted by other unitary radios;
   a multiplicity of antennas, where at least one of the antennas has two ports and is excited in substantially orthogonal modes concurrently by coupling two or more radio transceiver chains of a unitary radio to one or both of the ports, and where the excitation of the antenna radiates two or more different beams that transmit data from the data channel at substantially the same frequency; and
   an interface matrix coupled to the multiplicity of unitary radios and the multiplicity of antennas, the interface matrix configured to at least selectively interconnect a first radio transceiver chain to a first port of the at least one antenna to generate a first beam and interconnect a second radio transceiver chain to the first port or a second port of the at least one antenna to generate a second beam different from the first beam concurrently.

4. The wireless base station or access point of claim 3, wherein at least one of the antennas is coupled to different radio transceiver chains via a common port of the antenna so as to radiate different beams using substantially orthogonal polarizations.

5. The wireless base station or access point of claim 3, wherein at least one of the antennas is coupled to different radio transceiver chains via different ports of the antenna so as to radiate different beams in substantially non-overlapping spatial directions.

6. The wireless base station or access point of claim 3, wherein at least one of the antennas is excited so as to concurrently radiate multiple beams by coupling two different radio transceiver chains from a common unitary radio to one port of the antenna.

7. The wireless base station or access point of claim 3, wherein at least one of the antennas is excited so as to concurrently radiate multiple beams by coupling one radio transceiver chain to each of the two ports of the antenna.

8. The wireless base station or access point of claim 3, wherein at least one of the antennas is excited so as to concurrently radiate multiple beams by coupling two different radio transceiver chains from a common unitary radio to two different ports of the antenna.

9. The wireless base station or access point of claim 3, wherein at least one of the antennas is excited so as to concurrently radiate multiple beams by coupling two different radio transceiver chains from a common unitary radio to a common port of the antenna and coupling two different radio transceiver chains from the common radio to a different common port of the same antenna.

10. The wireless base station or access point of claim 3, wherein at least one of the antennas is a configurable antenna.

11. The wireless base station or access point of claim 3, wherein at least one of the antennas is a travelling wave antenna, leaky-wave antenna or a metamaterial leaky-wave antenna.

12. The wireless base station or access point of claim 3, wherein at least one of the antennas consists of a multiplicity of planar antenna elements.

13. The wireless base station or access point of claim 3, wherein at least two of the multiple unitary radios provide different radio services concurrently to similar spatial sectors.

14. The wireless base station or access point of claim 3, wherein at least two of the multiple unitary radios provide different radio services concurrently to different spatial sectors.

15. The wireless base station or access point of claim 3, wherein at least two of the multiple unitary radios provide radio frequency communication signals using different radio frequency communication technologies.

16. The wireless base station or access point of claim 3, further comprising:
a processor bank including one or more processors, the one or more processors configuring the interface matrix to selectively interconnect radio transceiver chains to the multiple antennas.

17. The wireless base station or access point of claim 16, further comprising:
a communication interface coupled to the processor bank to receive information from a network configuring the interface matrix to selectively interconnect radio transceiver chains to the multiple antennas.

18. The wireless base station or access point of claim 3, further comprising:
a processor bank including one or more processors, the one or more processors configuring the configurable antennas.

19. The wireless base station or access point of claim 3, further comprising:
a communication interface coupled to the processor bank to receive information from a network configuring the antennas.

20. The wireless base station or access point of claim 3, wherein more than one unitary radio is interfaced with a single processor.

21. The wireless base station or access point of claim 3, wherein more than one unitary radio is interfaced with a single processor.

22. The wireless base station or access point of claim 3, wherein at least two of the multiple unitary radios provide different radio services concurrently to similar spatial sectors.

23. The wireless base station or access point of claim 3, wherein at least two of the multiple unitary radios provide different radio services concurrently to non-overlapping spatial sectors.

24. The wireless base station or access point of claim 3, wherein different radio services are provided concurrently to similar spatial sectors.

25. The wireless base station or access point of claim 3, wherein different radio services are provided concurrently to non-overlapping spatial sectors.

26. The wireless base station or access point of claim 3, wherein at least one of the unitary radios is enclosed in a physical unit that is remotely located from at least one of the antennas.

27. The wireless base station or access point of claim 3, wherein at least two antennas are fabricated on a common printed circuit board.

28. The wireless base station or access point of claim 3, wherein at least one of the antennas and a part of the interface matrix are fabricated on a common printed circuited board.

29. The wireless base station or access point of claim 3, wherein at least two of the multiple unitary radios transmit in different frequency bands.

30. A method of configuring a wireless base station or access point comprising a multiplicity of unitary radios and antennas, where each unitary radio is comprised of a multiplicity of radio transceiver chains and each unitary radio is configured to transmit a data channel that is independent of data channels transmitted by other unitary radios and where at least one of the antennas has at least two ports, the method comprising:
exciting at least one of the antennas in substantially orthogonal modes concurrently by coupling two or more radio transceiver chains of a unitary radio to one or both of the ports, where the excitation of the antenna radiates two or more different beams that transmit data from the data channel at substantially the same frequency;
selectively interconnecting at least one radio transceiver chain to the antenna ports using an interface matrix; and
dynamically configuring the interface matrix or the antennas to radiate radio frequency signals into one or more spatial sectors.

31. The method of claim 30, further comprising:
assigning at least two of the unitary radios to one spatial sector; and
configuring the at least two unitary radios to provide different radio services to the one spatial sector.

32. The method of claim 31 further comprising:
obtaining configuration data specifying one or more spatial sectors to be provisioned by the wireless base station or access point, a number of unitary radios, a data channel of a particular unitary radio and specific antenna ports assignable to the particular unitary radio; and
generating, by a processor, one or more control signals for the interface matrix, the control signals causing the interface matrix to selectively interconnect at least one radio transceiver chain of the particular unitary radio to the specific antenna ports to allow concurrent differentiated radio services to the one or more spatial sectors.

33. The method of claim 32, further comprising:
receiving, through a communication interface, a policy specifying performance and service levels for at least one user; and
automatically and without further input from the user, specifying the configuration data to establish a wireless connection from the wireless access point or base station to the at least one user in accordance with the policy.

34. A wireless base station or access point comprising:
means for assigning multiple unitary radios of the wireless base station to multiple antennas of the wireless base station, where each unitary radio is comprised of a multiplicity of radio transceiver chains and each unitary radio is configured to transmit a data channel that is independent of data channels transmitted by other unitary radios and where at least one of the antennas has at least two ports and where at least one of the antennas is excited in substantially orthogonal modes concurrently by coupling two or more radio transceiver chains of a unitary radio to one or both of the ports, and where the excitation of the configurable antenna radiates two or more different beams that transmit data from the data channel at substantially the same frequency;
means for selectively interconnecting the multiple unitary radios to one or more of the multiple antennas; and
means for dynamically configuring the interface matrix or the antennas to radiate radio frequency signals into one or more spatial sectors.

35. The wireless base station or access point of claim 34, further comprising:
means for providing different services to a common spatial sector or multiple spatial sectors through one or more of the multiple antennas.

36. The wireless base station or access point of claim 34, further comprising:
   means for using different radio frequency communication technologies to provide services to a common spatial sector or multiple spatial sectors through one or more of the multiple antennas.

37. A wireless base station or access point comprising:
   at least one Multiple Input Multiple Output (MIMO) unitary radio with a multiplicity of radio transceiver chains;
   at least one multi-port antenna with at least two ports configured to generate a first beam in response to a first signal from a first radio transceiver chain and to generate at least a second beam in response to at least a second signal from the multiplicity of radio transceiver chains, where the at least second signal is generated by a different radio transceiver chain; and
   an interface matrix coupled to the at least one MIMO unitary radio and the at least one multi-port antenna, the interface matrix configured to interconnect the first and the at least second signals from the at least one MIMO unitary radio to one or more ports of the at least one multi-port antenna, where the at least one multi-port antenna is excited in substantially orthogonal modes concurrently by coupling two or more radio transceiver chains of the at least one MIMO unitary radio to one or more of the multi-port antenna ports, and where the excitation of the at least one multi-port antenna radiates two or more different beams that transmit data from the data channel at substantially the same frequency.

* * * * *